Jan. 1, 1929.

W. L. NEELY 1,697,134

BAKELIZED ARMATURE COIL

Filed Nov. 21, 1925

WITNESSES:
A. G. Schiefelbein
O. B. Buchanan

INVENTOR
William L. Neely
BY
Wesley G. Carr
ATTORNEY

Patented Jan. 1, 1929.

1,697,134

UNITED STATES PATENT OFFICE.

WILLIAM L. NEELY, OF WILKINSBURG, PENNSYLVANIA, ASSIGNOR TO WESTINGHOUSE ELECTRIC AND MANUFACTURING COMPANY, A CORPORATION OF PENNSYLVANIA.

BAKELIZED ARMATURE COIL.

Application filed November 21, 1925. Serial No. 70,630.

My invention relates to insulated conductors or coils and methods of making the same and it has particular relation to the preparation of the coil sides which are intended to be inserted in the slots of dynamo-electric machines.

An essential feature of my invention is the utilization of a coil side wherein a hardened impregnated shell of insulating material is placed around an inner shell of flexible material which is not so impregnated.

Another important feature of my invention is the utilization of wax-impregnated, form-wound coil-sides wherein the wax permeates the spaces between the individual wires of the coil and the interstices of the first or inner flexible insulating covering, the coil side being then wrapped with tape which is impregnated and hardened, after which a micarta folium wrapping is preferably added.

Figure 1:
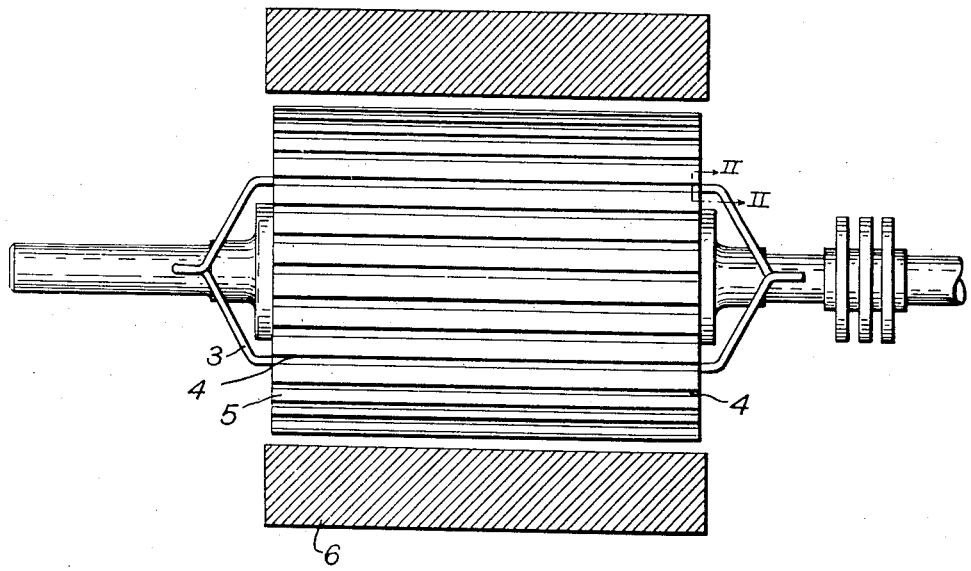

The foregoing and other novel features of my invention, their methods of use, and the purposes for which they are adapted will be clear from the following description with reference to the accompanying drawing, wherein, Figure 1 is a diagrammatic view illustrative of a dynamo-electric machine and showing one armature coil in place.

Figure 2:
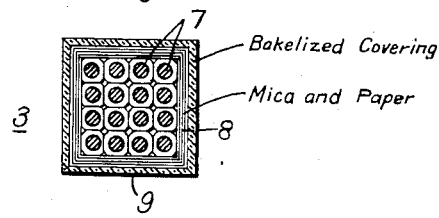
Figure 3:
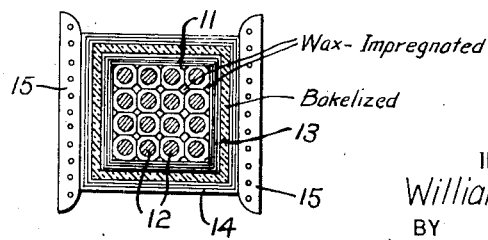

Fig. 2 is a sectional view on the line II—II of Fig. 1, showing a cross section of a specially constructed bakelized coil-side embodying some features of my invention, and Fig. 3 is a similar view showing my most recent wax-impregnated coil-side prepared in accordance with my invention.

In the drawing, my invention is shown as being embodied in an armature coil 3 which is placed in slots 4 in the rotor member 5 of a dynamo-electric machine, the stator member being indicated schematically at 6.

The coil 3 is shown as a diamond-shaped coil comprising a number of insulated wires 7 which are suitably wound or formed to make up the coil. In the form of invention shown in Fig. 2 the coil-sides, or portions of the coil which lie in the armature slots, are impregnated with bakelite and hardened into a rigid structure. The coil-sides are then wrapped with a flexible inner insulating cover 8, preferably of mica-covered paper. The inner flexible covering 8 is then wrapped with an impregnable material having interwoven threads or fibers, such as cotton or asbestos tape, and the coil is formed and pressed into shape and. at the same time, impregnated with bakelite or other similar material which has the property of hardening under suitable treatment.

The coil-sides, which are adapted to fit into the slots 4, are pressed to exactly predetermined dimensions during the heat treatment of the bakelite. When the outer casing 9 solidifies, the bakelite will have penetrated the tape covering, but it will not have penetrated the mica-covered paper, leaving the latter substantially as flexible as it was before the heat treatment.

By reason of the above-described construction, an armature coil is provided wherein the inside layers of the insulation are more or less flexible but are held compactly in place by a thin outside casing of hard or stiff insulating material. Even though the outside shell should crack under handling, a very large percentage of the flexible insulation would still remain intact, and would provide all of the insulation which would be required. My improved coil is particularly applicable to use on railway motors where the conditions of operation have been very difficult to meet, with the insulated coils heretofore in use.

In the form of my invention shown in Fig. 3, the use of bakelite impregnation for filling the spaces between the individual conductors of the coil-sides has been avoided, owing to the difficulties which have been encountered with the bakelized material, by reason of the facts that the bakelite is not altogether water-proof, that it deteriorates, and that its insulating qualities are not as high as those of other materials which it would be desirable to use. A very desirable material for impregnating purposes is wax, which comes in different grades suitable for different purposes. A general quality of waxes, however, is that they soften under heat and are very far from stiff, even at the ordinary running temperatures of armature coils. Furthermore, the matter of treating the wax-impregnated coil-ends with bakelite has presented difficulties by reason of the fact that the wax melts at such a lower temperature than the bakelite.

Heretofore, most coils have been impregnated with bakelite on the coil-sides, or portions which fit into the armature slots, and they have been impregnated with wax on the end turns. If an attempt should be made to utilize wax-impregnated coil-sides, it would be found that the coil-side would warp and swell and become otherwise distorted in shape, requiring much hammering and handling to make it anywhere near usable, and the very handling of the coil would tend to cause further distortions.

I have successfully utilized form-wound coils 10 which are wrapped with a fabric 11 to hold the conductors 12 in place. The coil thus prepared is then placed in an impregnating tank, submitted to heat and vacuum treatment and impregnated with wax according to methods which are well known in the wax-impregnating art.

The wax-impregnated coil, with its wax-impregnated covering, is then wrapped with a second tape wrapping 13, which is brushed with bakelite over the portions of the coil which are to lie in the armature slots. It will be noted that the wax-impregnated inner layer of insulation is non-impregnable and not penetrated by the bakelite which is brushed on the second wrapping, since the wax effectually fills all of the pores in the inner covering and prevents the penetration of any further impregnating material.

After the bakelite varnish has dried sufficiently so that it will not stick to the press, the coil sides are heated and pressed, which hardens the outer layer 13 into a hard, stiff layer which conforms the coil side to the exact shape of the slot, or portion of the slot to be occupied by the coil, preventing swelling, and to a remarkably large extent, preventing warping or bending of the flexible, wax-impregnated coil-sides. It has been found, also, that the process just described results in the formation of a hard, outer shell, without distorting the wax-impregnated inner portion, notwithstanding the fact that the wax melts at a very much lower temperature than that necessary to treat the bakelized outer casing 13.

An important practical feature of the bakelized covering 13 surrounding the gum impregnated coil side is that the hard outer covering 13 makes possible the utilization of a micarta-folium wrapping machine for applying a thin final wrapping of micarta folium 14 to the coil side, in accordance with a standard method of treating prior coil-sides which were impregnated with bakelite throughout the interstices between the individual conductors of the coil. The micarta folium 14 is wrapped around the coil-sides like a thin paper wrapping, and is then pressed by electrically heated irons 15 which move around and around the coil to draw the micarta folium into very close, intimate contact with the coil-side. Obviously, such treatment could not have been applied to the gum-impregnated coil side, by reason of the plastic nature and low melting point of the gum, if it were not for the hard, bakelized covering 13 which holds the inner gum-impregnated parts in place.

While I have described the outer impregnated casing 9 or 13 as being hard or stiff, I refer only to such hardness or stiffness as is characteristic of heretofore-used grades of impregnated coil insulation, as contrasted, for example, with the non-self-supporting or limp character of non-impregnated tape or paper.

While I have described my invention in two preferred forms, it is obvious that many changes in the choice of materials and in the exact details of construction may be resorted to without departing from the essential features of my invention. By the term "wax", for example, I mean to include all insulating impregnating materials which remain soft at all times. I desire, accordingly, that the accompanying claims shall be accorded the widest construction which their language will permit, when read in the light of the foregoing specification and the prior art.

I claim as my invention:

1. An armature coil-side comprising a plurality of insulated conductors compressed to a predetermined shape, a covering of flexible, relatively non-impregnable insulating material closely surrounding said coil-side; and a hardened casing of impregnated insulating material surrounding said flexible material and holding the same in place, said casing being compressed to a predetermined shape.

2. A composite insulating wrapping for an electrical conductor or conductors, comprising an inner covering of relatively non-porous, flexible sheet insulating material, and an outer insulating casing of threads or fibres pressed into shape and impregnated with a subsequently hardened impregnating material.

3. An armature coil-side comprising a plurality of insulated conductors wound to a predetermined shape and impregnated with wax, an inner covering of flexible, wax-impregnated insulating material closely surrounding said coil-side, and a casing of hardened impregnated material surrounding said flexible material and holding the same in place, said hardened casing being compressed to a predetermined shape.

4. An armature coil-side comprising a plurality of insulated conductors wound to a predetermined shape and impregnated with wax, an inner covering of flexible, wax-impregnated insulating material closely surrounding said coil-side, a casing of hardened impregnated material surrounding said flexible material and holding the same in place, said hardened casing being compressed to a predetermined shape, and a wrapping of thin insulating material of a type requiring to be ironed into place, surrounding said hardened casing.

5. The method of preparing form-wound armature coils which consists in wrapping the form-wound coils with an impregnable insulating tape, soaking the coil thus formed in wax, covering the coil-sides with a second impregnable wrapping of insulating tape, impregnating said second insulating covering with an insulating material which hardens under heat and pressure, and subjecting said second impregnated covering to a heat and pressure treatment for hardening the same and holding the coil-sides in shape.

6. The method of preparing form-wound armature coils which consists in wrapping the form-wound coils with an impregnable insulating tape, soaking the coil thus formed in wax, covering the coil-sides with a second impregnable wrapping of insulating tape, impregnating said second insulating covering with an insulating material which hardens under heat and pressure, subjecting said second impregnated covering to a heat and pressure treatment for hardening the same and holding the coil-sides in shape, wrapping the coil-sides thus formed with a thin sheet insulating material, and ironing the latter into place.

In testimony whereof, I have hereunto subscribed my name this 17th day of November, 1925.

WILLIAM L. NEELY.